Feb. 13, 1951 J. C. KOONZ ET AL 2,541,370
PRESSURE OPERATED SWITCH
Filed Aug. 7, 1947

Inventors:
John C. Koonz
Chester L. Piper
By: Clarence J. Loftus
Attorney.

Patented Feb. 13, 1951

2,541,370

UNITED STATES PATENT OFFICE 2,541,370

PRESSURE OPERATED SWITCH

John C. Koonz, Fort Wayne, and Chester L. Piper, New Haven, Ind., assignors to The Magnavox Company, Fort Wayne, Ind., a corporation of Delaware Application August 7, 1947, Serial No. 766,936

4 Claims. (Cl. 200—83)

The present invention relates to an electric switch, and more particularly to a fluid pressure operated switch suitable for use with sequence operation systems or mechanisms. This invention is a further development of that shown in Patent No. 2,502,326, granted March 28, 1950.

The modern domestic washers are automatic since they are provided with a sequence operation mechanism which controls washing, rinsing and drying of clothes. The washer is provided with hot and cold water connections each operated by solenoid actuated valves. In such washers the clothes are placed within the washer which is then closed or sealed. A suitable clock mechanism is set so as to determine the length of time for the washing cycle dependent upon the type of clothes being cleaned. The main control switch is then actuated and all subsequent operations of the washer are carried out by the sequence operation mechanism including filling and emptying the washer with hot and cold water.

For proper operation of the washer it is necessary to supply the correct amount of water. To control the amount of water supplied, an electric switch is employed which is so arranged as to be responsive to the water level in the washer. Commonly such switch has been located adjacent the bottom of the washer so as to be responsive to the water pressure. It has been found, however, that unless some precautions are taken the switch may be actuated prematurely by surges of liquid. It furthermore has been found that surges of water at high water levels have a relatively steep wave-front which are due to the changes in water level during the washing operation and to the rotation of paddles or vanes in the washing machine rotor. Any attempt to minimize the effect of such surges by stiffening the diaphragm of the pressure operated switch introduces a load in series with the switch which results in inconsistent operation. To minimize this defect the pressure responsive switch or element which controls the water flow has been placed in particular locations. Often such locations have been difficult to keep clean, and not infrequently the location of the switch itself was in a relatively inaccessible position so as to make it difficult to properly service the washer.

In accordance with the present invention the above mentioned disadvantages have been overcome by employing a diaphragm which has practically no load characteristics in that it does not have any appreciable amount of stiffness of its own. This eliminates the effect of a series load between the pressure responsive element and the electric switch. In one embodiment a controlled air cushion is employed which permits a regulated displacement of the air in accordance with the weight of the water in the machine, but absorbs the transient steep wave-front surges. Such an arrangement may be provided with a regulated orifice to provide the desired degree of operation. In another form of the invention it is contemplated to employ a relatively small air cushion having a constant air orifice.

It therefore is the object of the present invention to provide an improved electric switch adapted to be actuated only by sustained fluid pressure.

Another object of the present invention is to provide a fluid pressure operated switch which is not responsive to transient fluid pressure.

A still further object of the present invention is to provide an improved fluid pressure operated switch for automatic washers which may be located in any desired position for ready cleaning and servicing.

A still further object of the present invention is to provide in an improved fluid pressure operated switch an arrangement whereby the operation will be responsive to a selected water level.

Still another object of the present invention is to provide in an improved pressure operated switch an arrangement whereby the point at which the switch opens may be adjusted without affecting the point at which the switch closes.

Other and further objects of the present invention subsequently will become apparent by reference to the following description taken in conjunction with the accompanying drawing wherein.

Figure 1:
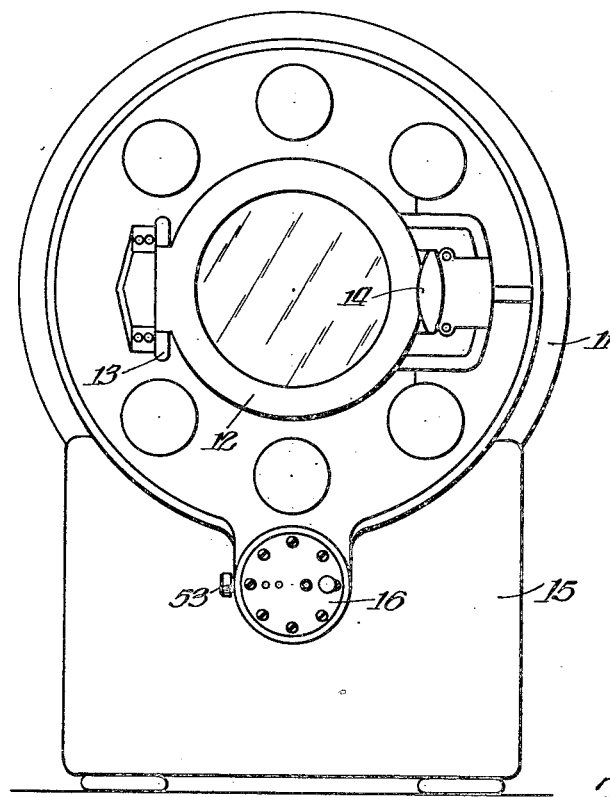
Figure 1 shows an automatic washer of the type for which the present invention is particularly suited.

In Figure 1 there is shown an automatic washer having a cylindrical tub or washing chamber 11 which is adapted to be sealed by a door 12 provided with a hinge 13 and a latch 14. The washing chamber or tub 11 is supported in a horizontal position by a casing which has a base 15. The base 15 contains or houses an electric motor and a sequence operation mechanism including the timing devices, water control valves and electric circuits. The details of such sequence operation mechanism are well known in the art and hence are not shown or described in detail.

The sequence operation mechanism within the base 15 is associated with suitable connections to hot and cold water. Each of these connections is provided with a solenoid operated valve. These solenoid operated valves are actuated at different times during the operating cycle of the washer. The valves are opened at the beginning of each washing and rinsing portion of the cycle of operation and closed whenever the water level within the washing chamber 11 has reached the proper height. A fluid responsive switch 16 is located in the proximity of the bottom or the lower portion of the washing chamber or tub 11.

Figure 2:
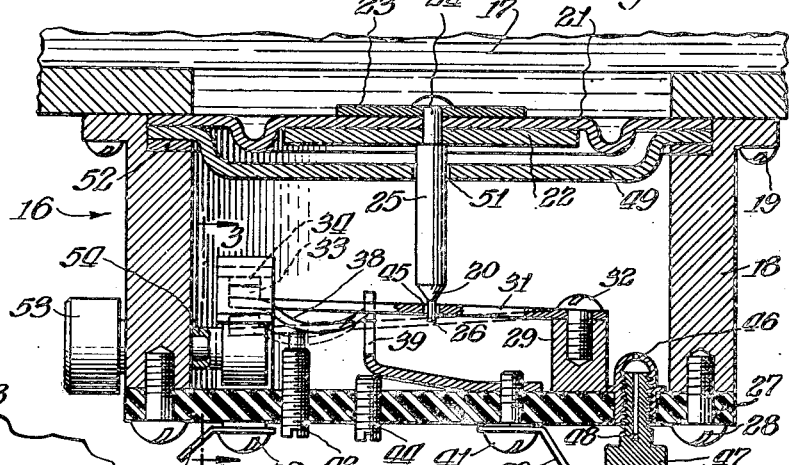
Figure 2 is a cross-sectional view of the present invention as applied to an automatic washer.
Figure 3:
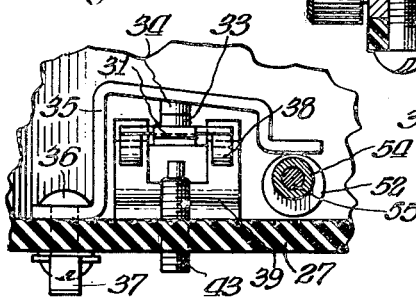
Figure 3 is a detailed view of a portion of the mechanism shown in Figure 2 as seen in the direction of the arrows along the line 2—2.

The fluid responsive switch 16 is shown in detail in Figures 2 and 3 which shows a portion of the washing chamber or tub 11 containing water or cleaning fluid 17. A housing 18 is secured to the washing chamber 11 by suitable fastenings such as screws 19. The housing 18 is positioned on a suitable opening in the washing chamber 11.

To close the opening in the washing chamber 11 adjacent the housing 18 there is provided a diaphragm 21. The diaphragm 21 is provided on its outer surface with a reinforcing plate or rigid disc 22. A smaller disc 23 is provided on the inner surface of the diaphragm 21. The diaphragm and the two discs are provided with central apertures for receiving the reduced diameter portion 24 of a pin 25. The reduced diameter portion 24 after passing through the two washers 22 and 23 may be spun over or riveted to form a head. The pin or shaft 25 at its other end is provided with another reduced diameter portion 26 for engaging the electric control switch.

The housing 18 carries a cover plate 27 which preferably is formed of suitable insulating material so as to serve as a support base for the electric switch. The cover 27 is secured in position by suitable fastening means such as cap screws 28. The cover plate 27 or base for the electric switch carries a post 29 to which is secured a lever arm 31 by a suitable screw 32. The lever arm 31 at its outer extremity carries an electric contact 33 for cooperation with an adjustable stationary contact 34. The adjustable stationary contact 34 is supported from a contact arm 35 which is connected to a bolt or rivet 36 passing through the base 27. The bolt or rivet 36 is connected to an electrical terminal 37 for completing an electrical connection to the switch. Adjacent the outer extremity of the lever 31 there is provided a spring member 38 which engages an upright bracket 39 secured in position by a suitable screw 41 which also engages an electric terminal 42. The plate 27 is provided with two set screws 43 and 44 for determining the closing and opening pressure values of operation of the switch.

The lever arm 31 at an intermediate point is provided with an aperture 45 through which the reduced diameter portion 26 of the pin 25 passes. The aperture 45 is formed so as to have sufficient clearance for the reduced diameter pin portion 26 so as to avoid undue friction and yet serves as a guide for the lower extremity of the pin 25. The reduced diameter portion 26 is interconnected with the remainder of the pin 25 by a tapered portion 29. The taper portion 29 will always seat in the hole 45 the lever 31 at exactly the same point thereby obviating any possibility of shifting of the rod 25 with respect to the lever which otherwise would change the operation of the switch. The ability of the switch to operate repeatedly at the same pressure values is dependent upon the engagement of the switch at the same point on lever arm by the rod 25. The switch contacts 33 and 34 are opened and closed by a snap action.

In accordance with one embodiment of the present invention it is contemplated to cause the diaphragm 21 to act against an air cushion. This air cushion is contained within the chamber formed by the housing 18. The sharp wave-front surges compress the air within the housing 18. The compression of the air therefore is sufficient to absorb the effect of transient water surges. In accordance with the water level in the washing chamber, however, the diaphragm 21 will be displaced a certain distance. It is desired to permit a certain regulated flow of air in and out of the chamber formed by the housing 18. In certain types of washers it is desired to provide a means whereby the flow of air out of the chamber formed by the casing 18 is regulated. Accordingly an adjustable valve casing 46 is provided with a valve 47. The valve 47 carries a slot 48 to permit the air to flow back and forth in accordance with its adjustment. The trapped air within the chamber therefore serves to absorb by compression the transient surges and yet permits the displacement of the diaphragm in accordance with the average water pressure due to the level of water in the washing chamber.

Another feature of the present invention is the provision of a relatively small air chamber immediately adjacent the outer surface of the diaphragm 21. This air chamber is provided by a dished member 49 having a central aperture 51. The aperture 51 is so arranged as to provide a predetermined regulated air passage for the air trapped between the member 49 and the diaphragm 21. The flange of the member 49 is immediately adjacent the outer flange of the diaphragm 21 and a suitable sealing ring or gasket 52 may be provided between these members and the housing 18. This arrangement provides a minimum volume of air in a chamber to minimize or reduce the movement of the diaphragm due to transient effects such as surging cleaning fluid. The clearance in the aperture 51 permits the push rod 21 to operate the switch without introducing any additional friction and at the same time to serve as a limiting orifice to restrict the flow of air in and out of the trapped air chamber.

It has been found that the surging forces which operate in a washer of this type are quite violent but of very short duration. Since the displacement of a diaphragm which acts to form one boundary of a given volume of air will upon the application of a given force move through a distance directly proportional to the volume of the enclosed air, it is desired to trap a relatively small volume of air and at the same time allow sufficient motion of the diaphragm to operate an electric switch in accordance with predetermined pressures. In the present instance the air trapped between the diaphragm 21 and the member 49 operates to a considerable extent as a nonvariable volume when confronted with the sharp impulses due to surges but at the same time acts as a variable air volume when confronted with the slower acting steady pressure change represented by the level of fluid in the washing machine. In certain types of washing machines it has been found sufficient to employ only the arrangement last described thereby dispensing with the controlled needle valve type of adjustment provided by the members 46, 47 and 48. While for certain washing machines the adjustable needle valve has been found best suited to control the operating conditions, it will of course be appreciated that either one or both of the arrangements heretofore described may be employed in controlling the operation of a switch which is to be responsive to the fluid pressure in a washing machine.

The adjustable stationary contact 34 carried by the switch arm 35 is arranged to be positioned by a cam 52 in response to actuation by a control knob 53. The control knob 53 is on the exterior of the device 16 and is connected to a shaft 55. The shaft 55 extends into an insulating sleeve or member 54 which in turn carries the cam 52. The purpose of providing the cam 52 so as to adjust the stationary contact 34 is to provide an arrangement whereby the water level in the washer 11 may be varied in accordance with the quantity of clothes to be cleaned.

It previously was stated that two adjusting screws 43 and 44 were provided in order to determine the opening and closing pressure values of the contact 33 and 34. These adjusting screws are preferably adjusted by a service man or adjusted at the factory. One way of adjusting the screws 43 and 44 is to fill the container 11 with the desired amount of water and adjust the screw 44 so that the contacts separate. This assumes, of course, that the previous adjustment was such that the contacts 33 and 34 are in closed circuit relation with this amount of water in the chamber 11. If the contact, however, happens to be open at this water level, the adjustment of the screw 44 is such as to first close the contacts whereupon the screw adjustment is reversed until the contacts open. The adjustment of the screw 44, however, has an effect upon the closing pressure value which in turn is determined by the adjusting screw 43.

Customarily the water is now drained to the minimum level at which it is desired to cause the switch to close the contact. At this point the screw 43 is adjusted upwardly so as to determine the closing pressure value of the contacts 33 and 34. The adjustment of the screw 43 has no effect upon the opening pressure value of the switch. The particular adjustment of the screw 43, however, is dependent upon the pressure value where the switch opens.

In order to provide some arrangement whereby the opening of the contacts 33 and 34 may be varied in order to make provision for a difference in the water level in the chamber 11 in accordance with different quantities or types of clothes to be washed, the cam 52 may be rotated. The rotation of the cam 52 changes the position of the stationary contact 34 but has no effect upon the closing pressure value of the switch contacts 33 and 34. It, therefore, becomes apparent that the adjustment of the screw 44 determines the snap action which is necessary for the opening of the circuit contacts 33 and 34. The adjustable positioning of the contact 34 determines within a certain range the pressure value at which the switch will open, and hence controls the high water level in the chamber 11.

It will be appreciated that the control knob 53 may be provided with suitable graduations or may carry a pointer for cooperation with a graduated scale so as to give a proper indication of the water level to be selected for a certain washing operation by the user.

While in the illustrative embodiment shown the switch contacts 33 and 34 constitute the contacts of a single-pole, single-throw switch, it will be apparent that the contacts 33 and 34, together with adjusting screw 43, may be employed as a single-pole, double-throw switch whereby adjusting screw 43 then becomes a current-carrying member. This modification may be accomplished in a manner obvious to those skilled in the art, as by providing suitable insulation for member 43, such as a screw-threaded bushing, where required, and by placing a terminal connection on its outer end and a suitably-shaped contact, adapted to cooperate with contact 33, on its inner end.

While for the purpose of illustrating and describing the present invention, a preferred embodiment has been shown in the drawing, it is to be understood that the invention is not to be limited thereby since such variations in the components employed and in their arrangement are contemplated as may be commensurate with the spirit and scope of the invention set forth in the following claims.

What we desire to protect by United States Letters Patent is claimed as follows:

1. A pressure actuated switch having a movable member responsive to pressure changes, a plurality of air chambers damping means for eliminating surge effects in pressure changes, a cantilever switcharm having at one end an electrical contact, a spring connected to said arm to produce snap action movement thereof, a cooperating variably positioned stationary electrical contact for said arm, manually operable means for varying the position of said latter contact to vary the pressure value at which said contact will open without varying the closing pressure value of said contact, means for adjusting the tension of said spring to vary the opening and closing pressure values of said switch, and means for varying the pressure value at which said switch will close.

2. A snap action switch having a movable member responsive to changes in liquid levels, a cantilever switch arm carrying at its outer extremity an electric contact and having an aperture at an intermediate point, a rod interconnecting said cantilever switch arm with said means responsive to liquid levels, said rod having a reduced diameter portion freely passing through said aperture and a taper portion adjacent thereto to engage said aperture, spring biasing means for positioning a snap action movement of said cantilever arm, a variably positioned stationary contact for cooperation with the contact of said cantilever arm, and manually actuated means for varying the position of said latter contact to determine the liquid level at which said switch will open without affecting the closing point thereof, and adjustable means for determining the liquid level at which said switch will close.

3. A pressure operated electric switch comprising an air chamber having in one of its walls a member movable in response to pressure, a snap action electric switch, a rod connecting said member and said switch, said chamber having an aperture therein to serve as a restricted air passage and a passageway for said rod, said switch having a spring biased switch contact, means for adjusting the bias of said contact, and a variably positioned switch contact arranged to cooperate with said first contact.

4. A pressure operated electric switch comprising an air chamber having in one of its walls a member movable in response to pressure, a snap action electric switch, a rod connecting said member and said switch, said chamber having an aperture therein to serve as a restricted air passage and a passageway for said rod, said switch having a spring biased switch contact, means for adjusting the bias of said contact, and a variably positioned switch contact arranged to cooperate with said first contact, a closed housing for said switch to form a second air chamber, and adjustable vent means for controlling the flow of air in and out of said housing.

JOHN C. KOONZ.
CHESTER L. PIPER.

REFERENCES CITED

The following references are of record in the file of this patent:

UNITED STATES PATENTS

| Number | Name | Date |
|---|---|---|
| 1,209,234 | Truitt | Dec. 19, 1916 |
| 1,960,020 | McGall | May 22, 1934 |
| 2,033,417 | Dezotell | Mar. 10, 1936 |
| 2,246,581 | Fetter | June 24, 1941 |
| 2,295,456 | Eaton | Sept. 8, 1942 |
| 2,404,874 | Wohl | July 30, 1946 |
| 2,405,142 | Holt | Aug. 6, 1946 |
| 2,428,096 | Reavis | Sept. 30, 1947 |